May 9, 1967 C. E. GARRISON ETAL 3,318,505
PLASTIC CONTAINER WITH INTEGRAL DISPENSING TUBE
Filed April 9, 1965
2 Sheets-Sheet 1

INVENTORS
CHARLES E. GARRISON
DONALD G. KNELLER
CHARLES A. SPEAS
BY Raphael Semmes
ATTORNEY May 9, 1967
C. E. GARRISON ETAL
3,318,505
PLASTIC CONTAINER WITH INTEGRAL DISPENSING TUBE
Filed April 9, 1965
2 Sheets-Sheet 2
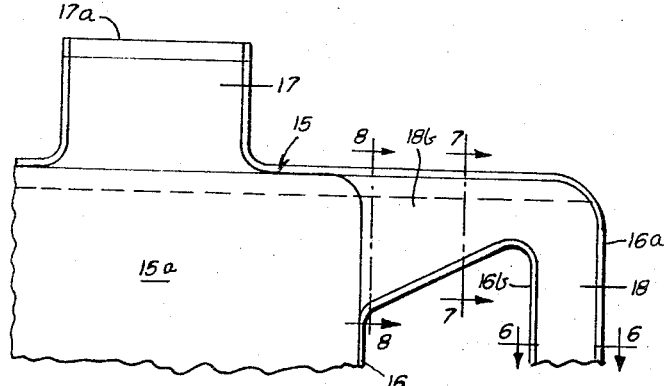
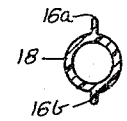
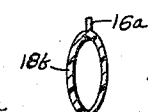
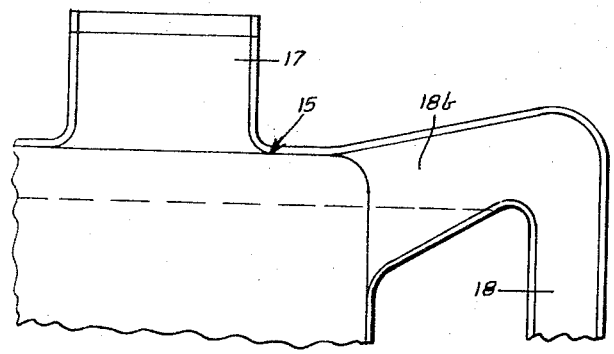
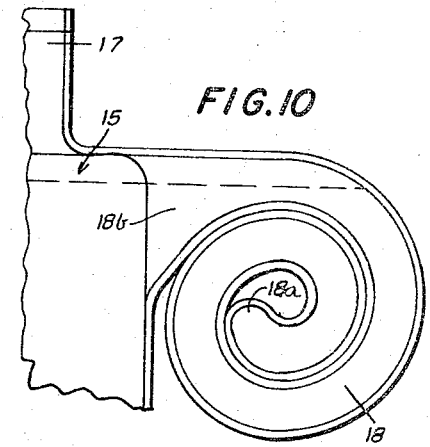
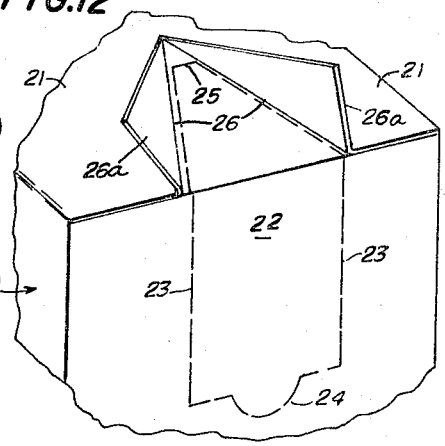
INVENTORS
CHARLES E. GARRISON
DONALD G. KNELLER
CHARLES A. SPEAS
BY Raphael Semmes
ATTORNEY

United States Patent Office 3,318,505
Patented May 9, 1967

3,318,505
PLASTIC CONTAINER WITH INTEGRAL DISPENSING TUBE
Charles E. Garrison, Valley Cottage, N.Y., and Donald G. Knelier, Lutherville, and Charles A. Speas, Towson, Md., assignors to Hedwin Corporation, New York, N.Y., a corporation of Maryland
Filed Apr. 9, 1965, Ser. No. 446,866
8 Claims. (Cl. 229—7)

This invention relates to plastic dispensing containers, and consists more particularly in new and useful improvements in a plastic container of the type which is thermoformed from two hot sheets of plastic by a known method which includes the heat sealing of two container halves, providing a seam which joins the bounding edges of the respective halves, and wherein a dispensing tube is integrally formed on one side of the container in the plane of the fused seam.

The primary object of the invention is to provide a thermoformed plastic container of this type wherein at least that portion of the integral dispensing tube adjacent the container body has a wall thickness greater than that of the container per se, so as to have sufficient rigidity to be self-supporting during the pouring operation, regardless of the length of the tube.

Another object of the invention is to provide a plastic container having an integral dispensing tube which is formed simultaneously with the container body by a known dual hot sheet forming method, and wherein the fused seam of the container body is continued along both the upper and lower edges of the tube which is heat-sealed at its extremity, whereby, in addition to the increased wall thickness of the tube above referred to, it is reinforced longitudinally by the oppositely disposed fused seams.

It may be stated that this increased wall thickness of the dispensing tube results from the fact that in the thermoforming method, whether vacuum molding or blow molding, the initial parallel sheets in the areas which ultimately form the two halves of the dispensing tube are not expanded to such a great extent as the areas which form the container body proper, thus providing an elongated dispensing tube which is doubly reinforced both by its wall thickness and its fused seams.

Another object of the invention is to provide a plastic container having an elongated, integral dispensing tube which, although substantially self-supporting, is designed to transfer bending moments to the adjacent area of the container body to permit the tube to be bent and deformed temporarily to a degree sufficient to permit its folding for insertion in an outer carton and its removal therefrom during dispensing. The container is preferably formed of polyethylene which permits the necessary manipulation of the tube without damage thereto.

A further object of the invention is to provide a plastic container having an integral dispensing tube designed to avoid leakage either in storage, shipment, or use. Various conventional plastic containers, including film bag containers, employ separate fittings and hose lengths for the purpose of dispensing. Such dispensing devices are not only expensive, but often represent potential leakage at the fitment. They also involve extra procedures of removing the shipping cap and adding the dispensing cap device. The present invention contemplates a container having a conventional filling spout in its top and a second appendage in the form of the integral dispensing tube, both of which are formed integrally during the dual hot sheet forming method with a minimum of additional cost in the final container.

A still further object of the invention is to provide a composite package including a plastic container and integral dispensing tube of the type referred to, and an outer carton conforming generally to the contour of the container and provided with means to facilitate the removal of the dispensing tube for dispensing.

Still another object of the invention is to provide a composite package of this type having self-contained means for clamping the doubled over end of the dispensing tube to prevent leakage between intermittent pouring operations.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views:

FIG. 5 is an enlarged fragmentary view showing the junction or throat of the dispensing tube and the container body in the form shown in FIG. 1;

FIGS. 6, 7 and 8 are sectional views taken on lines 6—6, 7—7, and 8—8 respectively of FIG. 5, showing the wall thicknesses of the dispensing tube at various points;

FIG. 9 is a modified configuration of the dispensing tube throat, designed to provide the outlet from the container to the tube in a position located above the level of the liquid in the container at all times;

FIG. 10 is a further modification of the dispensing tube arrangement wherein the tube is coiled within itself to facilitate the use of a longer tube which may still be folded into an outer carton;

FIG. 11 represents two further modified forms of the container and tube; and

FIG. 12 is a detail illustrating the method of opening the carton for withdrawing the folded dispensing tube.

Figure 1:
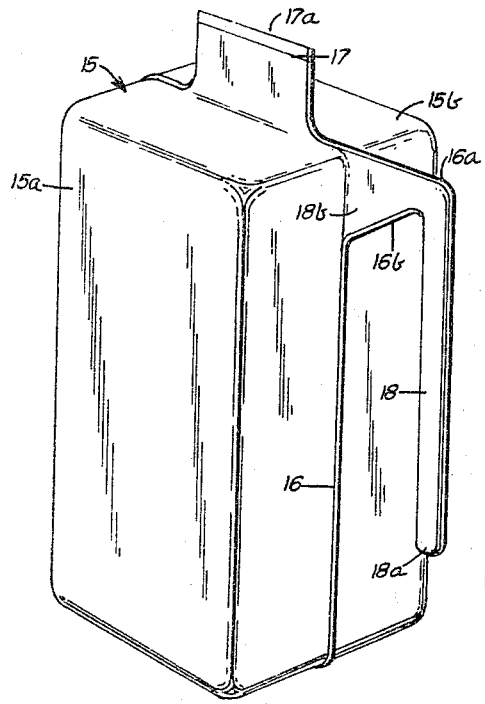
FIG. 1 is a perspective view of one form of container and integral dispensing tube of the present invention.

In the drawings, referring first to FIG. 1, the numeral 15 generally designates the container of the present invention, which, as before stated, is thermoformed from two hot plastic sheets of a flexible thermoplastic material, such, for example, as polyethylene, which, as is known, has an unusual combination of properties, including freedom from taste, odor, toxicity, a suitable degree of flexibility at extremely low temperatures, low moisture-vapor transmission, resistance to chemicals, solvents, gases, and good characteristics from the tensile, impact, and other physical points of view. It will be understood, however, that other thermoplastic materials, such as vinyls, acetates, and styrenes, and others, may be utilized. The two halves 15a and 15b of the container, which, although flexible, are of self-sustaining rigidity, are heat-sealed together in face-to-face contact along the seam 16 around their bounding edges.

Preferably, the container body is formed with an integral filling spout 17, the opposite halves of which are formed integrally with the respective container halves 15a and 15b and heat-sealed by continuations of the fused seam 16. The upper edge 17a of the filling spout 17 is designed to be closed by heat-sealing after the container has been filled. Also integrally formed during the dual hot sheet forming process is a dispensing tube 18 which projects laterally and then downwardly on one side of the container in the plane of its fused seam 16. It will be apparent that the respective halves of the tube 18 are integrally formed with the halves of the body 15 and heat-sealed along upper and lower seams 16a and 16b which are continuations of the main fused seam 16, and, preferably, the lower extremity or discharge end of the tube 18 is heat-closed as at 18a.

As previously stated, the wall thickness of at least that portion of the dispensing tube 18 adjacent the container body 15 is substantially greater than the wall thickness of the container body per se, due to the fact that in the thermoforming process it undergoes less expansion than the walls of the container, and this automatically provides a far more rigid structure for the dispensing spout, which, together with the longitudinal seams 16a and 16b, provide a dual reinforcement for the tube. This is of particular advantage when, for example, pouring liquid into a narrow neck, such as a battery cell, and simultaneously tilting the container. These reinforcements will prevent the tube from bending in and thus interrupting the flow.

Figure 2:
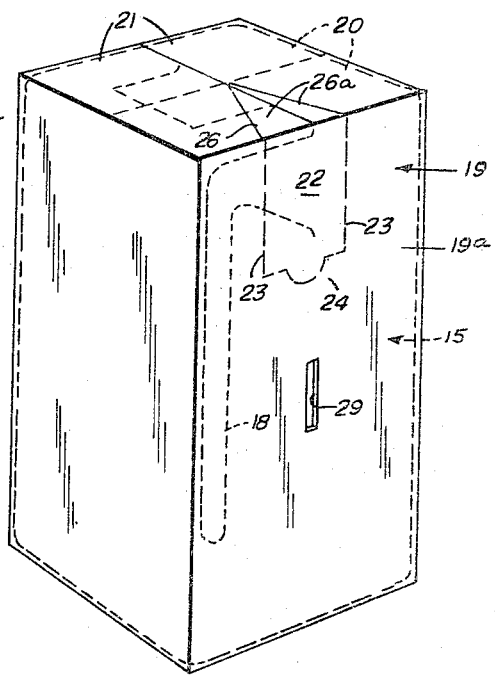
FIG. 2 is a similar view of the composite package including the container and outer carton in closed condition, the dispensing tube being shown in dotted lines in its laterally folded position.

The form of the invention illustrated in FIG. 1 is particularly adaptable for use in a composite package, such as shown in FIG. 2. Due to the particular characteristics of such thermoplastic materials as polyethylene, the tube 18 is sufficiently flexible to be temporarily bent laterally at the base of its thickened connecting section or throat 18b, without permanently deforming the tube. In other words, the tube is so designed that bending moments are transferred to the container body, the wall portion of which deflects upon manipulation of the tube. Preferably, the arrangement is such that the folded tube 18 occupies the open space between the rounded vertical edge of the body 15 and the 90° vertical corner of the carton so that the tube can be folded against the adjacent vertical wall of the container body 15 and enclosed within an outer carton 19 without creating an objectionable localized bulge in the wall of the carton. The structure of the carton 19 and the manipulation of the dispensing tube with respect thereto will be discussed more in detail at a later point in the specification.

If it is desired to provide a container which will permit the static storage of the filled container or partly filled container without the necessity of clamping off the tube, the form shown in FIG. 9 is preferable. Here, it will be seen that by disposing the connecting area or throat 18b of the tube 18 to the body of the container 15 at an upward angle, the throat of the container is always located above the liquid level in the container body, thereby preventing the discharge of fluid until the container is tilted.

In order to provide a container with a longer dispensing tube, while still retaining the laterally foldable feature for inclusion in an outer carton, the embodiment shown in FIG. 10 may be employed. Here, it will be seen that the tube 18 is coiled so that its closed end 18a is located substantially centrally within the coil, and the coiled tube can be folded laterally at the base of its connecting section 18b to lie flatly against the adjacent wall of the container body 15, and when it is desired to dispense fluid from the container, the tube is simply uncoiled and its closed end clipped off.

In forming this particular embodiment of the invention, a special mold section is employed to form the dispensing tube 18 in coiled form and to also heat-seal the halves of the tube. With a coiled tube of this type, the reinforcing effect of the seams must be taken into consideration due to the tendency of the seams to reduce the extent to which the tube can be pulled away from its molded configuration. However, by carefully determining the exact relationship of the seam size and the tendency to kink, an effective dispensing tube can be provided. Also, by reducing the diameter of the tube, as well as the seam dimensions, the tendency to kink can be reduced. Furthermore, by reducing the diameter of the tubing in coiled form, more length can be provided in the same space, or the same length of tubing may be accommodated in less space.

FIG. 11 illustrates alternative forms of a modified container wherein the dispensing tube 18 may be projected directly laterally either from the upper or lower extremities of the container body. In either of these variations, the reinforcement and rigidity of the dispensing tube normally retains it in projected condition for easy pouring.

Figure 3:
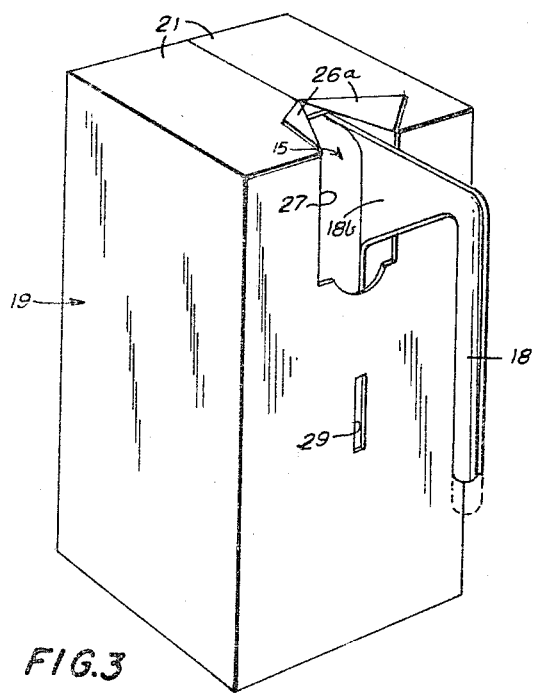
FIG. 3 is a perspective view similar to FIG. 2, but with the dispensing tube projected from an access opening for dispensing.

Returning now to the composite package, and more particularly the outer carton, reference is made to FIGS. 2, 3 and 12. The carton is of a size and contour to accommodate a container 15, and in the form shown in the drawings is rectangular in shape. The top is closed by two inner flaps 20 which are folded toward one another and meet at the dotted lines shown in FIG. 2, and outer flaps 21 are folded inwardly over the inner flaps in the usual manner. The front wall 19a of the carton is provided adjacent its upper edge with a pull-out area 22 which is formed in the carton wall by parallel perforated lines 23 joined at their lower extremities by a full cut line 24 which forms an actual gripping ear. The perforated lines 23 continue from the wall of the carton and converge in a full cut line 25 spaced inwardly from the hinged edge of the inner flap of the carton top. The overlying outer flaps are provided with two inwardly converging crease lines 26 which meet at a point adjacent the full cut line 25 in the underlying inner flaps.

Thus, by folding the adjacent corners 26a of the outer flaps 21 along their respective diagonal fold lines 26 and turning them upwardly, the perforated area 22 of the inner flaps is exposed. Thus, upon pulling out the severable area 22 from the walls 19a of the carton and inner flap, there is provided an access opening 27, as shown in FIG. 3. The tube 18, which until now has been folded and lies within the carton 19, is then pulled out of the opening 27 in the carton wall which has been formed by removal of the area 22. As previously pointed out, the polyethylene material of which the container and tube are formed is sufficiently flexible to permit the tube to be bent and deformed temporarily to a degree sufficient to remove the tube from the carton and to swing it out in line with the center of the carton for dispensing.

Figure 4:
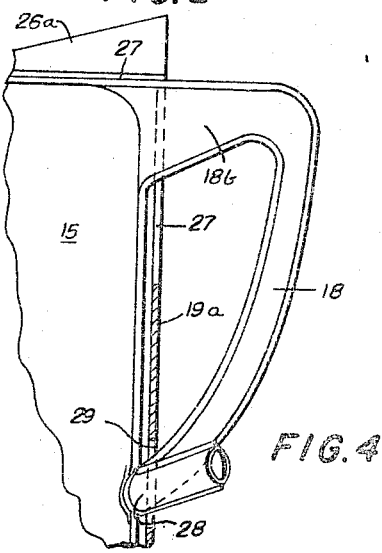
FIG. 4 is a fragmentary view illustrating the method of pinching off or clamping the folded end of the dispensing tube.

After withdrawing the tube from the carton, its lower end 18a is cut off for pouring, and, thereafter, the tube of the partially filled container can be clamped by bending or doubling over the cut-off end as shown at 28 in FIG. 4 and forcing the doubled end into the vertical slot 29 formed in the wall of the carton. Thus, the tube is temporarily pinched off or clamped until further pouring is required, avoiding the necessity of any special clamps and closing devices.

While in the particular form of the invention illustrated the entire dispensing tube is of increased wall thickness and longitudinally seamed, the essential feature of the invention is to provide an integral dispensing tube which is so designed that upon dispensing the contents of the container or manipulating the tube for folding into an outer carton, the dispensing tube does not kink, and it is the wall portion of the container body adjacent the point of tube connection which deflects. This principle can be achieved by providing the neck or connecting portion of the tube of greater thickness than the container body and the remainder of the tube; by providing a tube neck portion which is vertically oval in cross-section; or by simply stiffening the top seams of the tube neck portion. In either of these instances, the design of the neck portion of the tube is such that it can be folded toward the container body for storage within an outer carton.

It will be readily apparent that the container and composite package of the present invention are adaptable to many uses, and by varying the configuration of the tube, while still retaining its reinforcing qualities, numerous storage and dispensing needs can be met.

From the foregoing, it is believed that the invention may be readily understood by those skilled in the art without further description, it being borne in mind that numerous changes may be made in the details disclosed without departing from the spirit of the invention as set forth in the following claims.

We claim:

1. A one-piece plastic container for liquids, comprising a body of relatively thin, flexible, semi-rigid, thermoplastic material, and an elongated dispensing tube formed integral with one side wall of said body and opening into the interior thereof, at least that portion of said dispensing tube adjacent said body being of greater rigidity than said side wall to transfer bending moments to the latter, said dispensing tube being normally coiled upon itself and adapted to be uncoiled for dispensing.

2. A one-piece plastic container for liquids, comprising a body of relatively thin, flexible, semi-rigid, thermoplastic material, and an elongated dispensing tube formed integral with one side wall of said body and opening into the interior thereof, at least that portion of said dispensing tube adjacent said body having a wall thickness and rigidity greater than that of said body to provide self-sustaining rigidity said dispensing tube being connected to said body by a neck portion which is vertically oval in cross section.

3. A plastic container as claimed in claim 2, wherein said dispensing tube has a throat opening into the interior of said body which is directed at an upward and outward angle and disposed above the liquid level in said container.

4. A plastic container for liquids, comprising a body of relatively thin, flexible, semi-rigid, thermoplastic material, consisting of two halves, each having wall portions sealed together along mating edges by a fused seam, and an elongated dispensing tube integrated with one seamed wall of said body and opening into the interior thereof, said dispensing tube being formed in two halves integral with respective halves of said body and sealed together and reinforced longitudinally by continuations of said fused seam, the wall thickness of at least that portion of said dispensing tube adjacent said body being greater than that of said body and sufficient to provide additional self-sustaining rigidity for said tube.

5. A plastic container for liquids, comprising a body of relatively thin, flexible, semi-rigid, thermoplastic material consisting of two halves, each having wall portions sealed together along mating edges by a fused seam, a filling spout integrated with and opening into the interior of said body, said spout being formed in two halves integral with respective halves of said body and sealed together along said fused seam, and an elongated dispensing tube integrated with one seamed side wall of said body and opening into the interior thereof, said dispensing tube being formed in two halves, integral with respective halves of said body and sealed together and reinforced longitudinally by continuations of said fused seam, the wall thickness of at least that portion of said dispensing tube adjacent said body being greater than that of said body and sufficient to provide additional self-sustaining rigidity for said tube.

6. In a composite package, an outer carton and an inner container, the latter having a body portion, an elongated, flexible, semi-rigid dispensing tube connected to and projecting from an adjacent side wall of said container, said dispensing tube being foldable at its base laterally onto said adjacent side wall for insertion of said container into said carton, the top of said carton being closed by overlapping outer and inner flaps respectively hinged to the upper extremities of right angularly disposed side walls of said carton, one of said carton side walls and the adjacent hinged inner flap being provided with a common severable area which extends from the upper portion of said carton side wall into said last-named hinged inner flap adjacent the point of connection of said tube to said container side wall, and the adjacent corners of the meeting edges of respective outer flaps being upwardly foldable along crease lines, whereby, when said corners are folded upwardly, said severable area may be removed to provide an access opening through which said flexible tube may be withdrawn from said outer carton.

7. A composite package as claimed in claim 6, wherein said carton side wall is provided with a relatively narrow slot which is downwardly spaced with respect to said access opening, the end portion of said flexible dispensing tube being foldable upon itself and insertable in said slot for clamping off said tube.

8. A composite package as claimed in claim 7, wherein said outer carton is of rectangular shape, said dispensing tube being connected to said side wall of said container by an outwardly projecting neck of a length substantially equal to the distance between its base and an adjacent vertical edge of said container, and terminating in a vertically suspended dispensing tube portion, whereby, when said neck is folded at its base, said vertically suspended portion of said tube occupies the open space between said vertical edge of said container and the adjacent vertical corner of said carton.

References Cited by the Examiner

UNITED STATES PATENTS

| | | | |
|---|---|---|---|
| 3,082,927 | 3/1963 | Winstead | 229—14 |
| 3,090,526 | 5/1963 | Hamilton et al. | 229—14 X |
| 3,138,293 | 6/1964 | Roak et al. | 229—14 X |
| 3,199,742 | 8/1965 | Hill | 229—14 X |
| 3,206,093 | 9/1965 | King | 229—14 |
| 3,233,817 | 2/1966 | Casady | 229—14 |

FOREIGN PATENTS 357,996   12/1961   Switzerland.

JOSEPH R. LECLAIR, *Primary Examiner.*

D. F. NORTON, *Assistant Examiner.*